(12) United States Patent
Yamada et al.

(10) Patent No.: US 7,676,651 B2
(45) Date of Patent: Mar. 9, 2010

(54) MICRO CONTROLLER FOR DECOMPRESSING AND COMPRESSING VARIABLE LENGTH CODES VIA A COMPRESSED CODE DICTIONARY

(75) Inventors: Hiromichi Yamada, Tokyo (JP); Yuichi Abe, Tokyo (JP); Yasuhiro Nakatsuka, Tokyo (JP); Takanaga Yamazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 10/611,315

(22) Filed: Jun. 30, 2003

(65) Prior Publication Data

US 2005/0021929 A1    Jan. 27, 2005

(30) Foreign Application Priority Data

Jul. 1, 2002    (JP) .............................. 2002-192573

(51) Int. Cl.
*G06F 9/30* (2006.01)
(52) U.S. Cl. ...................... 712/210; 712/205
(58) Field of Classification Search .................. 710/68, 710/210; 341/67; 712/210, 205
See application file for complete search history.

(56) References Cited

U.S. PATENT DOCUMENTS 5,870,576 A * 2/1999 Faraboschi et al. .......... 712/210
6,199,126 B1 * 3/2001 Auerbach et al. ............. 710/68
6,691,305 B1 * 2/2004 Henkel et al. ................ 717/136

OTHER PUBLICATIONS

U.S. Appl. No. 10/101,480, filed Mar. 20, 2002.
Code Pack™ PowerPC Code Compression Utility, User's Manual, Version 4.1.

* cited by examiner

*Primary Examiner*—Alford W Kindred
*Assistant Examiner*—Benjamin P Geib
(74) *Attorney, Agent, or Firm*—Hogan & Hartson LLP

(57) ABSTRACT

The invention provides a code compression technology that is favorable for a micro controller or other embedded system, and for compressed codes, resulting from conversion of program codes into variable length codes, and grouped program codes, address conversion information for specifying the start address of each group and compressed code type information for specifying the code length of each compressed code contained in a group are stored in a memory, and by enabling a corresponding compressed code address to be calculated from a code address output by a CPU, code compression that is favorable for a micro controller or other embedded system is realized.

10 Claims, 20 Drawing Sheets

Type 0
- Compressed format
- 16 types

Type 1
- Compressed format
- 256 types

Type 2
- Compressed format
- 1024 types

Type 3
- Non-Compressed format
- 65536 types

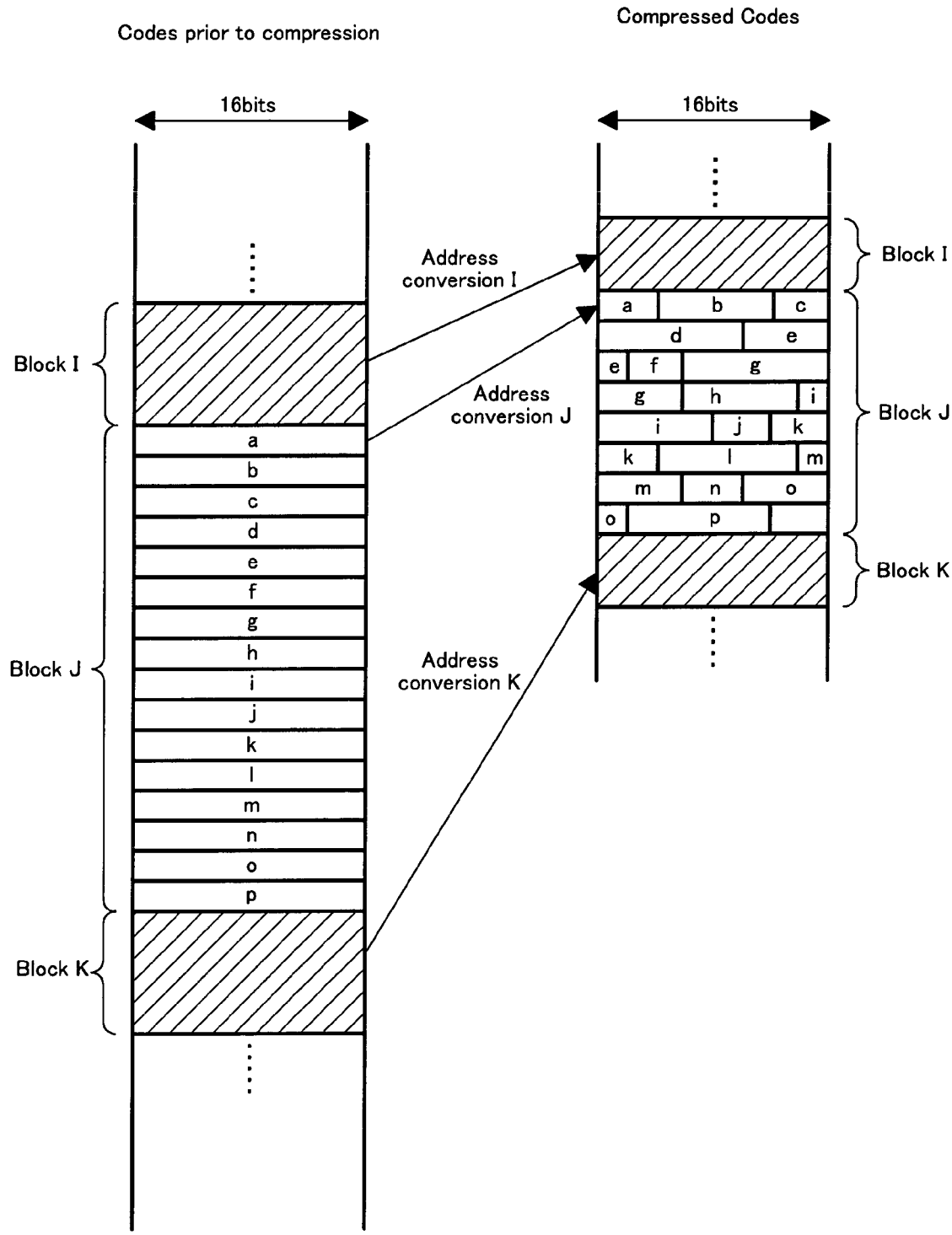

Codes prior to compression

Address conversion information

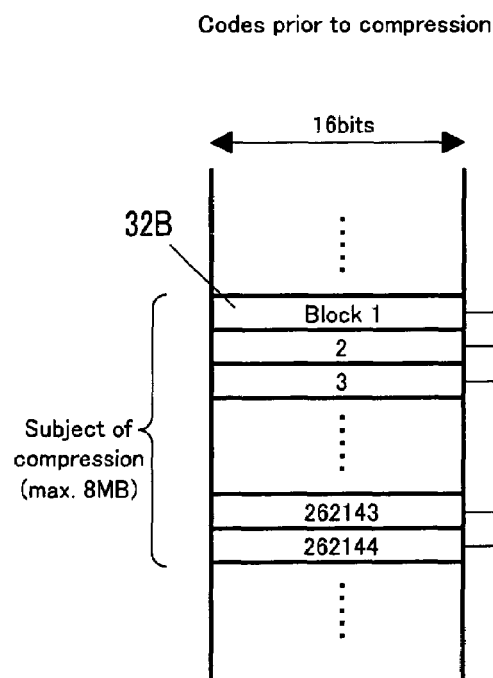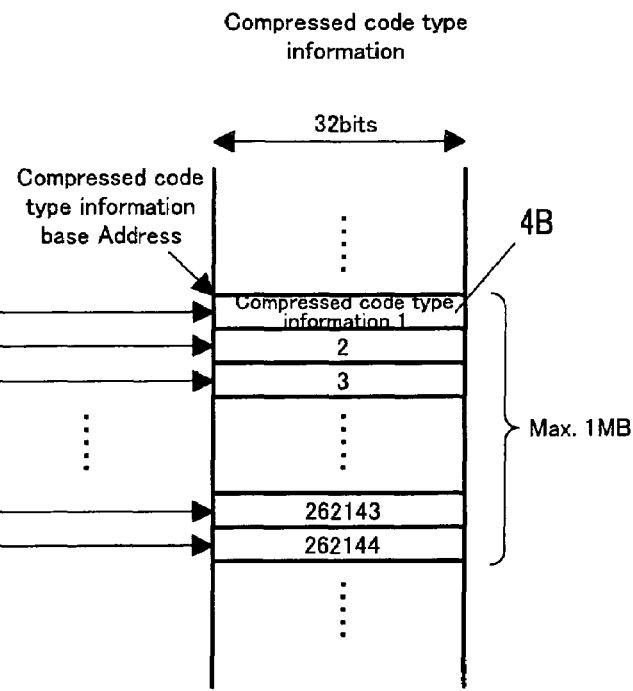
FIG. 7A Codes prior to compression
FIG. 7B Compressed code type information

FIG.13

| A[4:1] | ma | mb | mc | md | me | mf | mg | mh | mi | mj | mk | ml | mm | mn | mo |
|---|---|---|---|---|---|---|---|---|---|---|---|---|---|---|---|
| 0000 | Z | Z | Z | Z | Z | Z | Z | Z | Z | Z | Z | Z | Z | Z | Z |
| 0001 | sa | Z | Z | Z | Z | Z | Z | Z | Z | Z | Z | Z | Z | Z | Z |
| 0010 | sa | sb | Z | Z | Z | Z | Z | Z | Z | Z | Z | Z | Z | Z | Z |
| 0011 | sa | sb | sc | Z | Z | Z | Z | Z | Z | Z | Z | Z | Z | Z | Z |
| 0100 | sa | sb | sc | sd | Z | Z | Z | Z | Z | Z | Z | Z | Z | Z | Z |
| 0101 | sa | sb | sc | sd | se | Z | Z | Z | Z | Z | Z | Z | Z | Z | Z |
| 0110 | sa | sb | sc | sd | se | sf | Z | Z | Z | Z | Z | Z | Z | Z | Z |
| 0111 | sa | sb | sc | sd | se | sf | sg | Z | Z | Z | Z | Z | Z | Z | Z |
| 1000 | sa | sb | sc | sd | se | sf | sg | sh | Z | Z | Z | Z | Z | Z | Z |
| 1001 | sa | sb | sc | sd | se | sf | sg | sh | si | Z | Z | Z | Z | Z | Z |
| 1010 | sa | sb | sc | sd | se | sf | sg | sh | si | sj | Z | Z | Z | Z | Z |
| 1011 | sa | sb | sc | sd | se | sf | sg | sh | si | sj | sk | Z | Z | Z | Z |
| 1100 | sa | sb | sc | sd | se | sf | sg | sh | si | sj | sk | sl | Z | Z | Z |
| 1101 | sa | sb | sc | sd | se | sf | sg | sh | si | sj | sk | sl | sm | Z | Z |
| 1110 | sa | sb | sc | sd | se | sf | sg | sh | si | sj | sk | sl | sm | sn | Z |
| 1111 | sa | sb | sc | sd | se | sf | sg | sh | si | sj | sk | sl | sm | sn | so |

FIG.16

| i0 | i1 | i2 | r | s |
|----|----|----|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Address conversion information
(head address of compressed code block)

Address within block

Compressed code Address

MICRO CONTROLLER FOR DECOMPRESSING AND COMPRESSING VARIABLE LENGTH CODES VIA A COMPRESSED CODE DICTIONARY

BACKGROUND OF THE INVENTION

1. Field of the Invention

This invention relates to a micro controller, and particularly relates to a micro controller that processes compressed codes stored in a memory.

2. Prior Art

A micro controller is a device that is incorporated in a household electrical product, AV equipment, portable telephone, automobile, or other equipment and controls the equipment by performing processes in accordance with program codes stored in a memory.

Due to the property of being incorporated and used in equipments, the micro controller is required to exhibit the performance required to perform control of the equipment and be inexpensive at the same time.

However, in recent years, processes performed by micro controllers are becoming more complex and the programs necessary for processing are increasing in volume. The proportion that a program memory occupies within a micro controller is thus increasing and it is considered that this trend will continue into the future. Generally, as the capacity of a program memory increases, its cost increases accordingly, and how the program memory capacity can be kept low is thus an important problem in providing an inexpensive micro controller.

With general-purpose type information processing devices, such as personal digital assistants, etc., technologies for compressing program codes have been proposed for keeping the program memory capacity low, and actual applications of such technologies are also progressing.

For example, with a code compression technology called CodePack, proposed by IBM Corp., original codes are compressed and then stored in a program memory, etc. Here, in order to make the data compression ratio high, a compressed code is made a variable length bit pattern in accordance with the frequency of appearance, etc. In reading from the program memory, compressed codes are decompressed in predetermined block units and the decompressed original codes are stored in block units in a cache memory.

Since a compressed code has a variable length, the memory address of each code after compression will be irregular. A compressed code is thus made to contain information concerning its own code length, and in the reading process, the memory address of each compressed code is specified based on this information so that decompression will be carried out in order, starting from the compressed code at the head of a block.

Since compressed codes are decompressed in block units and stored in a cache memory, this code compression technology is considered especially effective for a general-purpose information processing device with which the hit rate of a cache memory is high and it is important to make the average program execution performance high.

However, though the formerly proposed code compression technology is suited, as mentioned above, for a general-purpose information processing device with which a high cache memory hit rate can be anticipated and it is important to make the average program execution performance high, it is not considered optimal necessarily for a micro controller or other embedded system.

This is due to the following reason. That is, with a micro controller or other embedded system, the loop processes in a program are few and the cache memory hit rate will not be as high as in a general-purpose information processing device. The rewriting of the cache memory thus occurs frequently. Since the rewriting of the cache memory is performed in block units, the decompression of a block containing a targeted code is performed each time rewriting is performed. Since in the case of a micro controller or other embedded system, codes besides the targeted code may not necessarily be used immediately subsequently, the decompression process can become excessive for simply acquiring the targeted code and the overhead for code decompression can become large. Also with an embedded system, a cache memory may not be equipped to start with since a high hit rate cannot be anticipated. Furthermore, with a micro controller or other embedded system, the real-time performance of enabling predetermined processes to be executed without fail within a control period is deemed more important than the average program execution performance.

Thus in comparison with a general-purpose type information processing device, that the address of a required compressed code can be specified at high speed is important with a micro controller or other embedded system.

An object of this invention is to provide a code compression technology that is favorable for a micro controller or other embedded system.

SUMMARY OF THE INVENTION

In order to achieve the above object, this invention provides: a micro controller, comprising a CPU performing processing in accordance with a program, the microcontroller further comprising: a memory, storing: compressed codes, resulting from the conversion of program codes into variable length codes; address conversion information, specifying the head address of each group of grouped program codes; and compressed code type information, specifying, according to each group, the code length of each compressed code contained in each group; and a compressed code processing part, specifying, from a code address output by the CPU, an address conversion information and compressed code type information to be referred, using the specified address conversion information and compressed code type information to determine the corresponding compressed code address, and reading the corresponding compressed code.

Here, the abovementioned memory may furthermore store dictionary information for decompressing compressed codes into the original codes and the abovementioned compressed code processing part may refer to the abovementioned dictionary information to decompress the compressed code, which has been read, into the original code.

By arranging compressed codes, resulting from the conversion of program codes into variable length codes, and the program codes in groups, storing address conversion information, for specifying the start address of each group after conversion, and compressed code type information, for specifying the code lengths of the respective compressed codes contained in a group after conversion, in the memory, and enabling direct calculation of the compressed code address, corresponding to the code address output from the CPU, code compression that is favorable for a micro controller or other embedded system is realized.

As has been described above, this invention provides a code compression technology that is favorable for a micro controller or other embedded system.

BRIEF DESCRIPTION OF THE DRAWINGS

FIG. 3A and FIG. 3B show diagrams for explaining the correspondence between codes prior to compression and compressed codes in the first embodiment.

FIG. 7A shows diagrams for explaining the correspondence between codes prior to compression and FIG. 7B shows the compressed code type information in the first embodiment.

FIG. 13 is a diagram illustrating the operation of circuit 331, which masks part of the compressed code size of a single block that corresponds to the targeted compressed code and the parts thereafter with 0 in the circuit for calculating the number of bits from the head of a block to a targeted compressed code in the first embodiment.

FIG. 16 is a diagram illustrating the operation of a carry save adder, which is a component of carry save addition array 332-1 in the first embodiment.

DETAILED DESCRIPTION OF THE PREFERRED EMBODIMENTS

Embodiments of this invention shall now be described with reference to the accompanied drawings.

Figure 1:
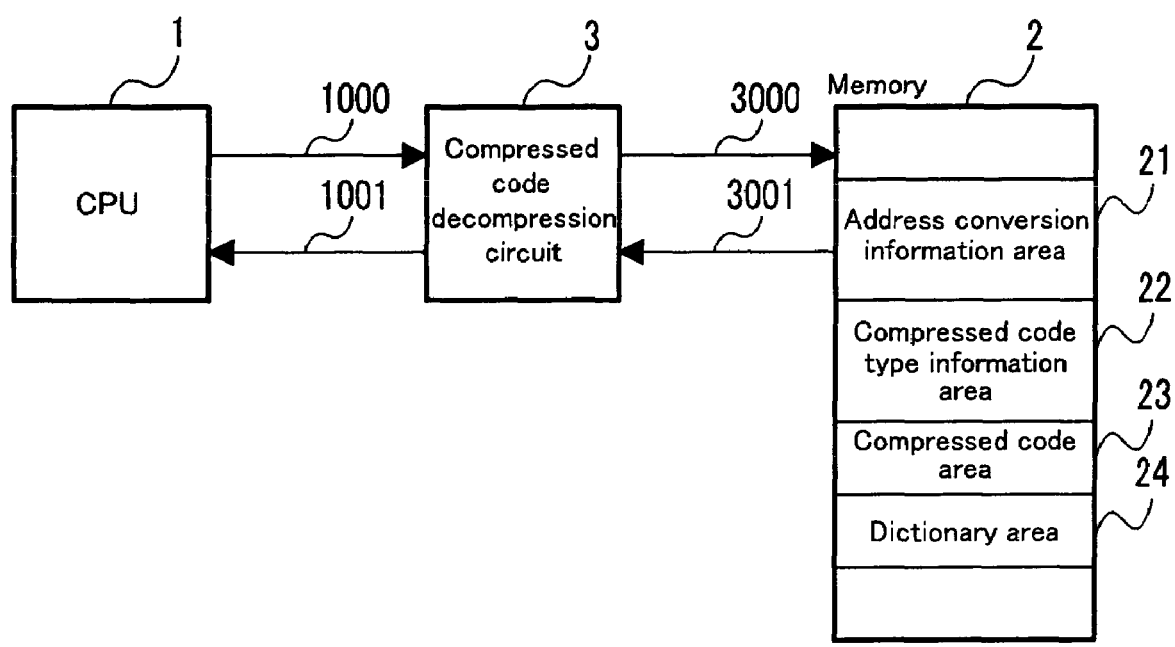
FIG. 1 is a block diagram for explaining the principal parts of the arrangement of an embodiment of a micro controller to which this invention is applied.

FIG. 1 is a block diagram for explaining the principal parts of the arrangement of an embodiment of a micro controller to which this invention is applied.

The micro controller is equipped with a CPU 1, which executes programs, a memory 2, which contains areas for storing programs upon compression, and a compressed code decompression circuit 3, which, in accordance with an instruction fetch or request for reading of data from CPU 1, reads a compressed code from the memory 2, decompresses the compressed code into the original code, and supplies the decompressed code to CPU 1.

The memory 2 is arranged to contain a compressed code area 23, storing compressed codes resulting from the conversion of program codes into codes of one or more types of code length, an address conversion information area 21 and a compressed code type information 22, respectively storing address conversion information and compressed code type information for conversion of the code address output by CPU 1 to a corresponding compressed code address, and a dictionary area 24, storing dictionaries for conversion of compressed codes to the original codes.

CPU 1 outputs a code address to CPU address bus 1000 and reads in the decompressed code from CPU data bus 1001. The compressed code decompression circuit 3 outputs an address to memory bus 3000, accesses memory 2, reads the address conversion information, compressed code type information, compressed code, and dictionary as necessary from memory data bus 3001, and outputs the decompressed code to CPU data bus 1001.

FIG. 2A, FIG. 2B, FIG. 2C and FIG. 2D are diagrams for explaining the compressed code formats of a first embodiment that illustrates the basic principles of this invention. Though four types of formats shall be described here as an example, the types of compressed codes are not limited thereto with the present invention. Also, though the unit of the original code to be compressed shall be 16 bits in this description, this invention is also not limited thereto. Since presently, 8 bits, 16 bits, and 32 bits are generally used as the sizes of instructions and data processed by a micro controller, the unit of the original code to be compressed in the present embodiment was set to 16 bits.

Figure 2A:
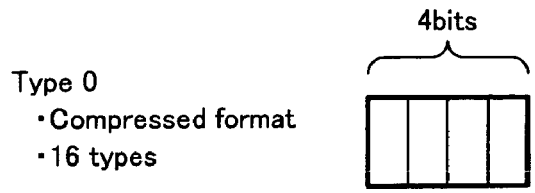
FIG. 2A shows a type 0 format with a code length of 4 bits.

FIG. 2A shows a type 0 format with a code length of 4 bits. 16 types of compressed code, from 0000 to 1111 can be defined by binary expression and a 16-bit code can be compressed to 4 bits, that is, to 25%.

Figure 2B:
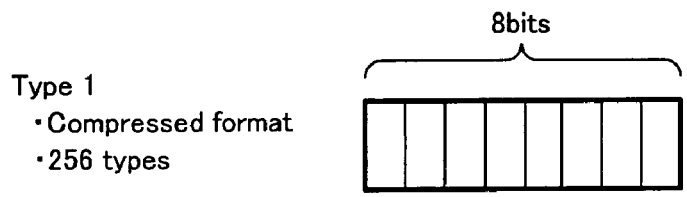
FIG. 2B shows a type 1 format with a code length of 8 bits.

FIG. 2B shows a type 1 format with a code length of 8 bits. 256 types of compressed code, from 00000000 to 11111111 can be defined by binary expression and a 16-bit code can be compressed to 8 bits, that is, 50%.

Figure 2C:
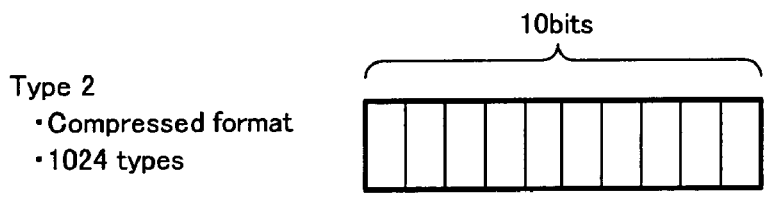
FIG. 2C shows a type 2 format with a code length of 10 bits.

FIG. 2C shows a type 2 format with a code length of 10 bits. 1024 types of compressed code, from 0000000000 to 1111111111 can be defined by binary expression and a 16-bit code can be compressed to 10 bits, that is, to 62.5%.

Figure 2D:
FIG. 2D shows a type 3 format with a code length of 16 bits.

FIG. 2D shows a type 3 format with a code length of 16 bits. Unlike type 0, 1, and 2, with this format, the code prior to compression is held as it is in a 16-bit field. A code is not compressed with this format.

For a compressed code of type 0, 1, or 2 format, a dictionary must be referred for decompression to the original code.

For the purpose of maximizing the compression ratio, it is preferable to check each program for the frequencies of appearance of codes and to define compressed codes in the order of type 0, type 1, type 2, and type 3, starting with codes of higher frequency of appearance. However, with the type 3 format, decompression can be performed at higher speed than other types since there is no need to refer the dictionary. Thus for high speed decompression, allocation to a type 3 format may be considered even for a code of high frequency of appearance, and with this invention, no restrictions in particular are defined concerning the relationship between the frequencies of appearance of codes and the allocation of types.

FIG. 3A and FIG. 3B are diagrams for explaining the correspondence between codes prior to compression and compressed codes. FIG. 3A is a diagram, showing a part of a memory map of codes prior to compression. In this figure, block I, block J, and block K are area parts into which the memory map of codes prior to compression is divided into units of 16 bits×16, that is, 256 bits (32 bytes). Each of a to p, shown in block J, indicates a 16-bit code, and the alphabetical characters are allocated to identify the order from the head of the block and have no relationship whatsoever with the value of the code. Also with the present embodiment, though the number of codes contained in a single block shall be 16, this number is not limited to 16 with this invention. However, this number is preferably a power of 2 for the reason of facilitating the address calculation of the address conversion information, compressed code type information, etc., to be described later.

FIG. 3B shows a memory map of compressed code area 23, corresponding to block I, block J, and block K. With each block of compressed code, codes are positioned starting from the 16-bit boundary. For the area of block J, the positions of compressed codes a to p are shown. As was described with the formats of FIG. 2A, 2B, 2C and 2D a compressed code takes on a size of 4 bits, 8 bits, 10 bits, or 16 bits. For example, compressed codes a, b, and c are contained in the first 16 bits of block J, and a compressed code d and a part of compressed code e are contained in the following 16 bits. Since 16 compressed codes are thus positioned continuously from the head of the block, a gap (a part containing no code) may occur after the last compressed code p.

The correspondence of the addresses of the codes prior to compression of FIG. 3A and the addresses of the compressed codes of FIG. 3B are controlled not in code units but in block units. That is, the head address of each block of compressed code is held. In FIG. 3, the manner of conversion to the head addresses of the blocks after compression is shown for each of block I, block J, and block K prior to compression. The address conversion information (information indicating the head addresses of the blocks after conversion) of these block units are stored, as was shown in FIG. 1, in an address conversion information area 21 of the memory 2.

Figures 4A, 4B:
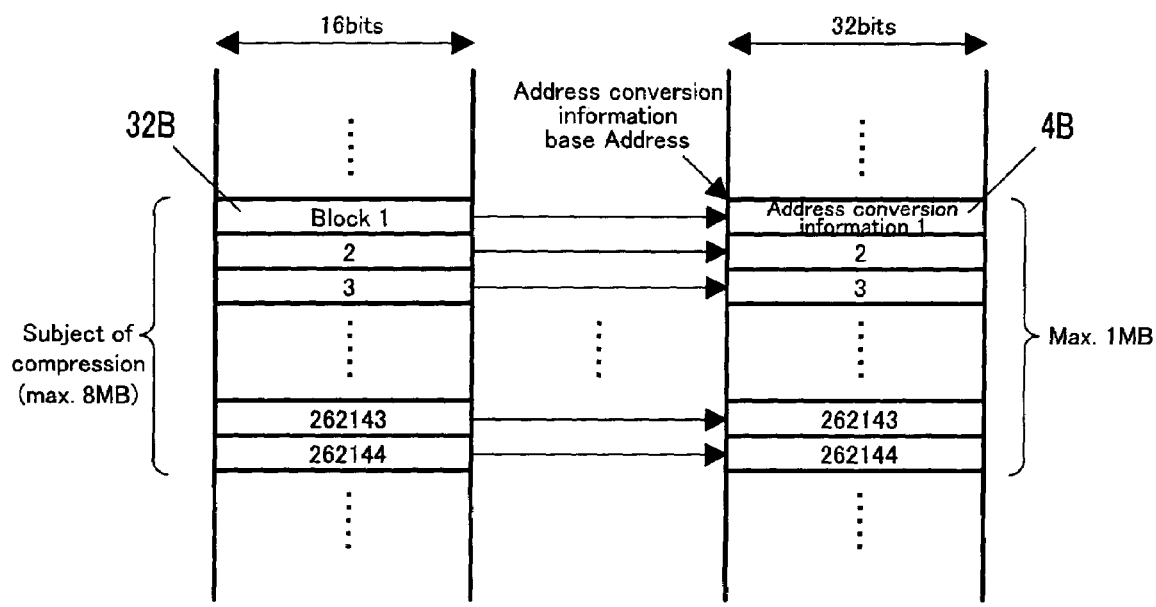
FIG. 4A shows diagrams for explaining the correspondence between the blocks of codes prior to compression and FIG. 4B shows the address conversion information in the first embodiment.

FIG. 4A and FIG. 4B show diagrams for explaining the correspondence between the blocks of codes prior to compression and the address conversion information. With the description here, the maximum volume of the codes to be compressed shall be 8 megabytes. FIG. 4A shows a memory map of codes of prior to compression (maximum of 8 megabytes). Since 16 codes of 16 bits each, that is, 32 bytes are contained in a single block of codes prior to compression, as was described with FIGS. 3A and 3B the maximum number of blocks is 262144.

FIG. 4B shows a memory map of an address conversion information area 21. Here, the address conversion information shall hold 32 bits (4 bytes) of information for each block. The address conversion information area 21 shall store address conversion information in a continuous manner in the order of the blocks and starting from an address called an address conversion information base address of the memory 2. Address conversion information area 21 has a maximum size of 4 bytes×262144, in other words, 1 megabyte.

Figure 5:
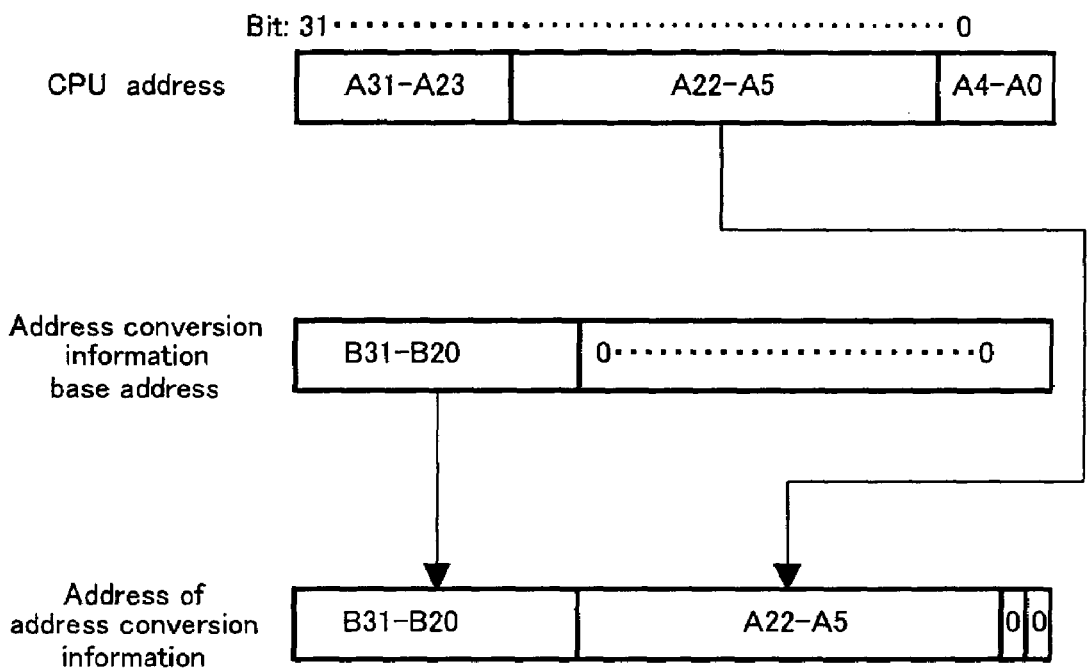
FIG. 5 is a diagram illustrating a method of calculation of the memory address of the address conversion information in the first embodiment.

FIG. 5 is a diagram illustrating a method of calculating the memory address of the address conversion information. In other words, this is a calculation method for determining the address of the address conversion information to be referenced. Here, the CPU address is the code address that is output by CPU 1. CPU 1 outputs the code address prior to compression as it is. The address length is 32 bits, the unit shall be bytes, and a maximum address space of 4 gigabytes can be designated.

With the present embodiment, an area of 8 megabytes, starting from an arbitrary 8-megabyte boundary of the memory 2 is set as the compressed code area 23. The 18 bits that continue from the 10th bit of the CPU address (fields A22 to A5) thus indicate the block number of the code and the last 5 bits (fields A4 to A0) indicate the byte address within the block.

With the address conversion information base address, only the values of the upper 12 bits (fields B31 to B20) can be set, the lower 20 bits are all fixed to 0, and a 1-megabyte boundary of the memory 2 can be designated. The address conversion information base address is stored in a register, etc., inside the compressed code decompression circuit 3.

The memory address for the address conversion information is generated by the method shown in the present figures and using the fields B31 to B20 of the address conversion information base address and the fields A22 to A5 of the CPU address. That is, the upper 12 bits are set to the fields B31 to B20 of the address conversion information base address, the 18 bits that follow are set to the fields A22 to A5 of the CPU address, and the last 2 bits are set to 0.

The compressed code type information that is stored in the compressed code type information area 22 of the memory 2 of FIG. 1 shall now be described. The compressed code type information is the information that identifies the type of format of the compressed code that was explained with FIGS. 2A, 2B, 2C and 2D. With the present embodiment, a 2-bit code is used to identify four types, with "00" being defined for type 0, "01" being defined for type 1, "10" being defined for type 2, and "11" being defined for type 3. Thus with the present embodiment, the type information of a compressed code is controlled separately from the compressed code.

Figure 6:
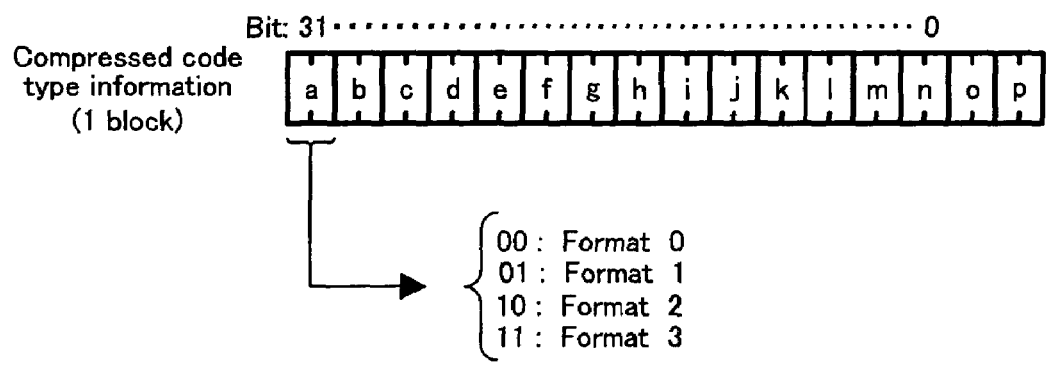
FIG. 6 is a diagram showing the compressed code type information for a single block of compressed code in the first embodiment.

FIG. 6 is a diagram showing the format of the compressed code type information with respect to a single block of compressed code. If as in the case of FIGS. 3A and 3B, the 16 compressed codes from the head of the block are labeled as a to p, with the compressed code type information, the information identifying the compressed code type are positioned in the same order of a to p of the compressed code, starting from the upper bit of the 32 bits.

FIGS. 7A and 7B show diagrams for explaining the correspondence between codes prior to compression and the compressed code type information. FIG. 7A shows a virtual memory map of codes prior to compression (maximum of 8 megabytes). Since the 32 bytes of 16 codes of 16 bits each are contained in a single block of codes prior to compression, the maximum number of blocks will be 262144.

FIG. 7B is a diagram showing a memory map of the compressed code type information area 22. As the compressed code type information, 32 bits (4 bytes) of information are held per block. With the compressed code type information area 22, compressed code type information are stored in a continuous manner in the order of the blocks and starting from an address called the compressed code type information base address of the memory 2. The compressed code type information area 22 has a maximum size of 4 bytes×262144 or 1 megabyte.

Figure 8:
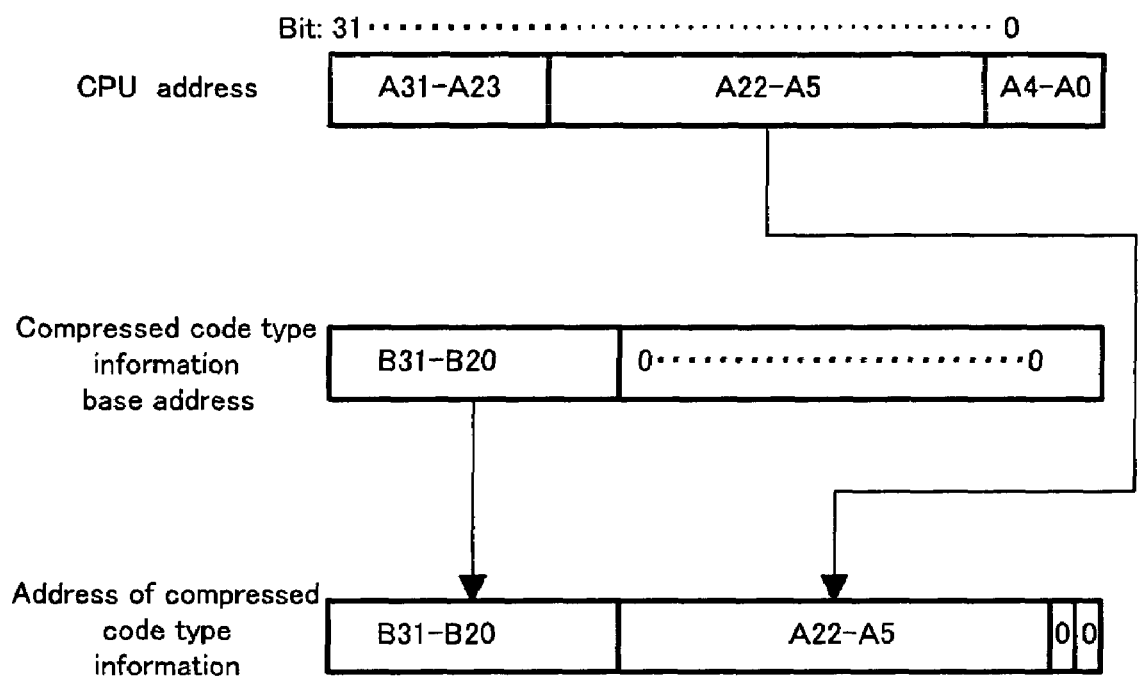
FIG. 8 is a diagram illustrating a method of calculating the memory address of compressed code type information in the first embodiment.

FIG. 8 is a diagram showing a method of calculating the memory address of the compressed code type information. As mentioned above, the fields A22 to A5 of the CPU address indicate the block number of a code.

With the compressed code type information base address, only the values of the upper 12 bits (fields B31 to B20) can be set, the lower 20 bits are all fixed to 0, and a 1-megabyte boundary of the memory 2 can be designated.

The memory address for the compressed code type information is generated by the method shown in the present figure and using the fields B31 to B20 of the address conversion information base address and the fields A22 to A5 of the CPU address. That is, the upper 12 bits are set to the fields B31 to B20 of the compressed code type information base address, the 18 bits that follow are set to the fields A22 to A5 of the CPU address, and the last 2 bits are set to 0.

Next, the dictionaries that are stored in the dictionary area 24 of the memory 2 of FIG. 1 shall be described. These dictionaries are tables for converting the compressed codes, described using FIGS. 2A, 2B, 2C and 2D, to the original codes. The dictionary for the type 0 format, with a code length of 4 bits, is a table of 16 bits×16, the dictionary for the type 1 format, with a code length of 8 bits, is a table of 16 bits×256, and the dictionary for the type 2 format, with a code length of 10 bits, is a table of 16 bits×1024.

Figure 9:
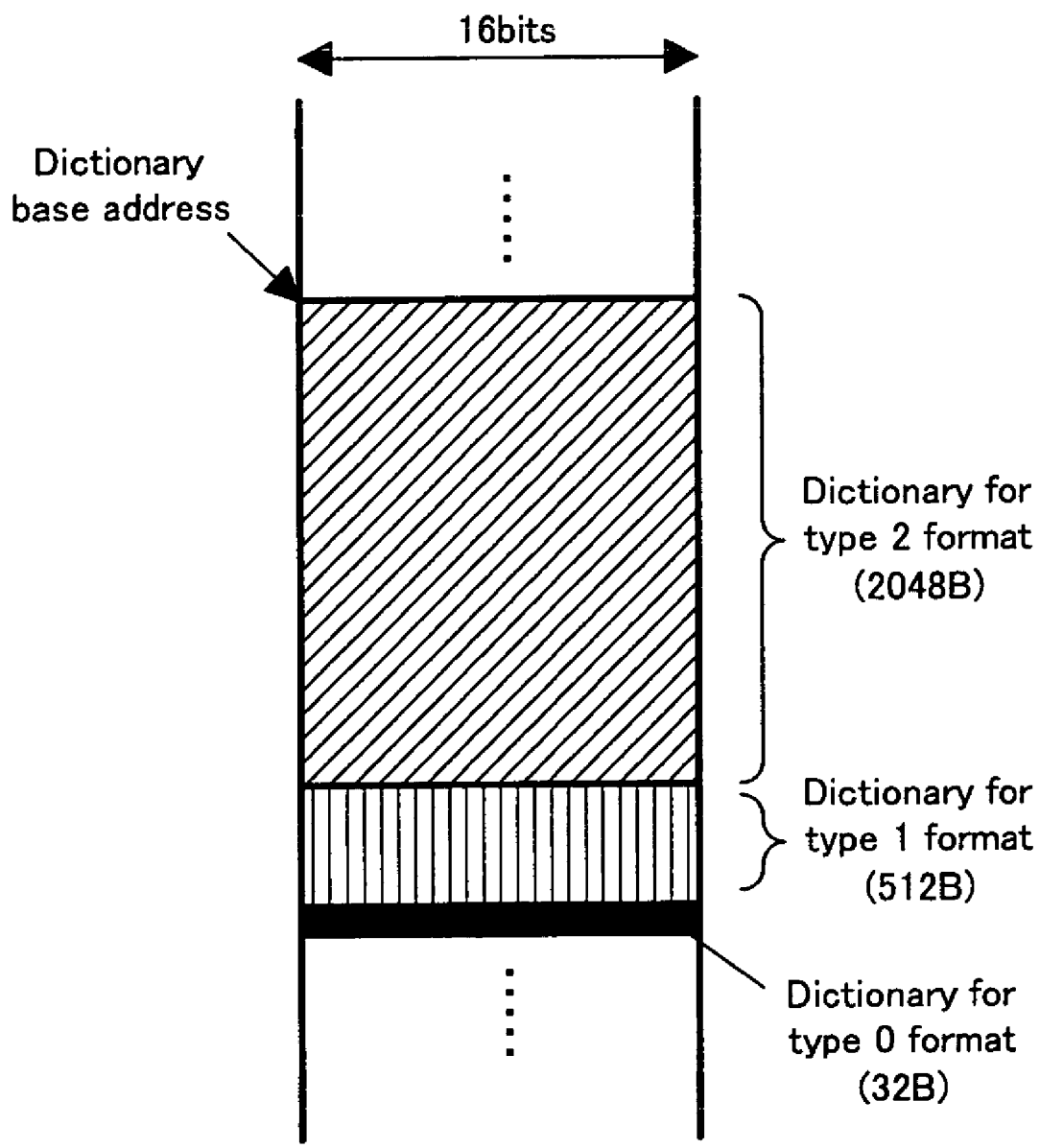
FIG. 9 is a diagram showing a memory map of dictionaries in the first embodiment.

FIG. 9 is a diagram showing a memory map of the dictionary area 24. In the dictionary area 24, the dictionaries are stored in the order of type 2, type 1, and type 0, starting from an address called the dictionary base address of memory 2.

Figure 10A:
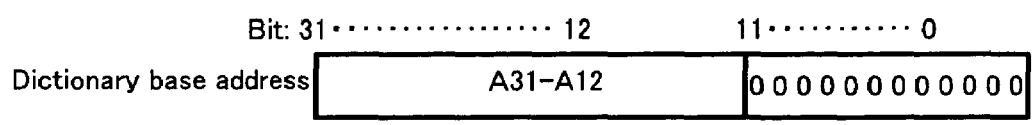
FIG. 10A, FIG. 10B, FIG. 10C and FIG. 10D show diagrams of a method of calculating the memory address of a dictionary in the first embodiment.
Figure 10B:
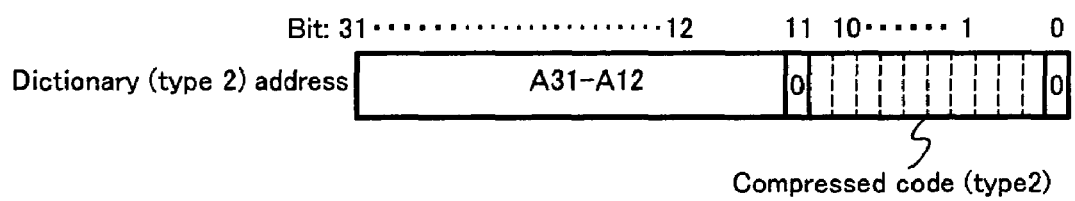
Figure 10C:
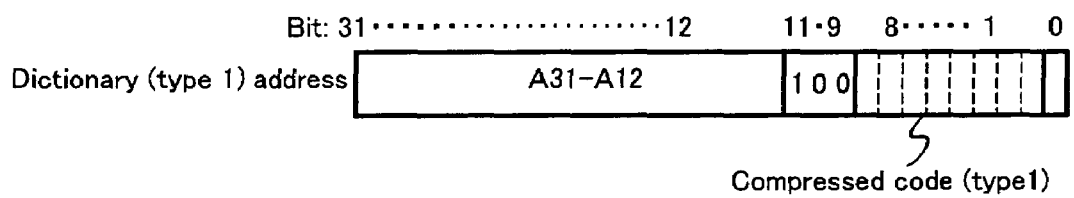
Figure 10D:
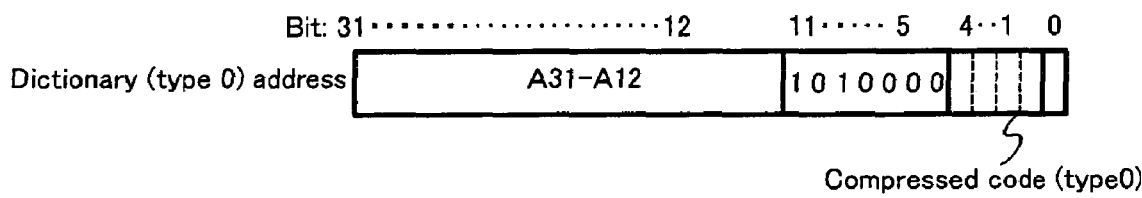

FIGS. 10A, 10B, 10C and 10D show diagrams of a method of calculating the memory address of a dictionary to be referenced. As shown in FIG. 10A, with the dictionary base address, the lower 12 bits are fixed to 0 and a 4096-byte boundary of the memory can be designated. FIGS. 10B, 10C and 10D correspond to the dictionary addresses for type 2, type 1, and type 0, respectively. In the dictionary area 24, original codes are stored according to each type and in the order of the compressed codes (for example with type 0, codes are stored in the order of 0000, 0001, 0010 . . . ). The memory address of a dictionary is thus generated by joining the fields A31 to A12 of the dictionary base address, an offset value according to type, the compressed code, and the "0" of a restart bit. Here, the offset value according to type is "0" for type 2, "100" for type 1, and "1010000" for type 0.

Next, the compressed code address calculation process that is carried out by the compressed code decompression circuit 3 shall be described. Returning now to FIGS. 3A and 3B, an example with which CPU 1 reads the 8th code h from the head of block J shall be described. First, the address calculation illustrated in FIG. 5 is performed using the code address output by CPU 1 and the address conversion information of block J is read. The address calculation illustrated in FIG. 8 is then performed and the compressed code type information of block J is read. The size of each of the 16 compressed codes in block J can be made known from the compressed code type information. That is, type 0 is 4 bits, type 1 is 8 bits, type 2 is 10 bits, and type 3 is 16 bits. The distance (number of bits) from the head to the 8th compressed code h of block J is equal to the sum of the sizes of the 1st to 7th compressed codes (a to g) of block J.

Figures 11, 12:
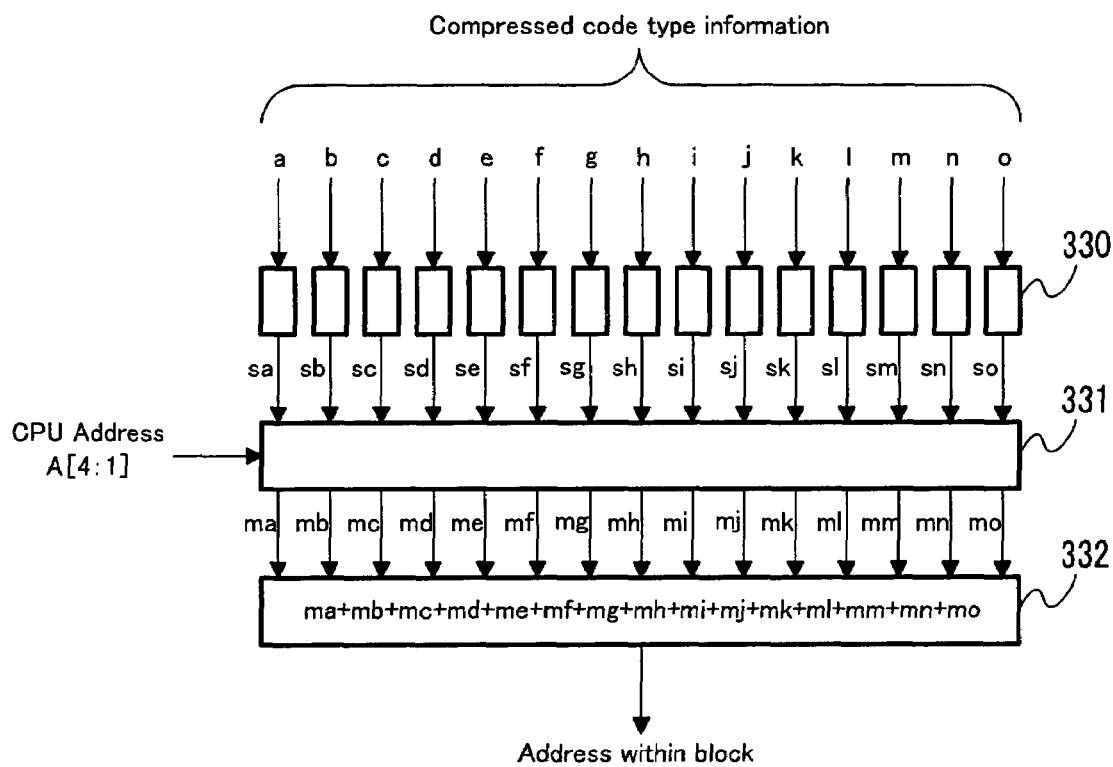
FIG. 11 is a diagram showing an example of a circuit for calculating the number of bits from the head of a block to a targeted compressed code in the first embodiment.
FIG. 12 is a diagram illustrating the operation of circuit 330, which converts compressed code type information to compressed code size in the circuit for calculating the number of bits from the head of a block to a targeted compressed code in the first embodiment.

FIG. 11 is a diagram showing an example of a circuit for calculating the number of bits from the head of a block to a targeted compressed code. In the figure, a to o indicate the type information of the 1st to 15th compressed codes of the block and the respective type information are converted to compressed code sizes sa to so at a circuit 330.

FIG. 12 is a diagram illustrating the operation of the circuit 330. The circuit 330 converts the compressed code type information i (2 bits) to size information o (4 bits). The value of size information o is a value obtained by dividing the code length of the type indicated by input i by 2. That is, this will be 2 for type 0, 4 for type 1, 5 for type 2, and 8 for type 3. This is done since the size of a compressed code is an integer multiple of 2 bits and by making the data one that is obtained by dividing by 2 (by shifting by 1 bit in the lower direction), the scale of the entirety of the circuit of FIG. 11 can be kept small.

The circuit 331 that is shown in FIG. 11 inputs the compressed code sizes sa to so and the bits 4 to 1 (A [4:1]) of the CPU address, and masks the part corresponding to the targeted compressed code and the data thereafter of the compressed code sizes with 0. ma to mo shall be used to refer to the compressed code sizes after masking.

FIG. 13 is a diagram illustrating the operation of the circuit 331. The values of A [4:1] of the CPU address and compressed code sizes ma to mo after masking are shown. Here, Z indicates that all 4 bits are 0. For the 8th code h of the block, A [4:1]=0111, ma to mg are sa to sg, respectively, and mh to mo are Z.

The circuit 332 shown in FIG. 11 is a circuit that adds the compressed code sizes ma to mo after masking. The output of this circuit becomes the address within the block from the head of the block to the targeted compressed code.

Figure 14:
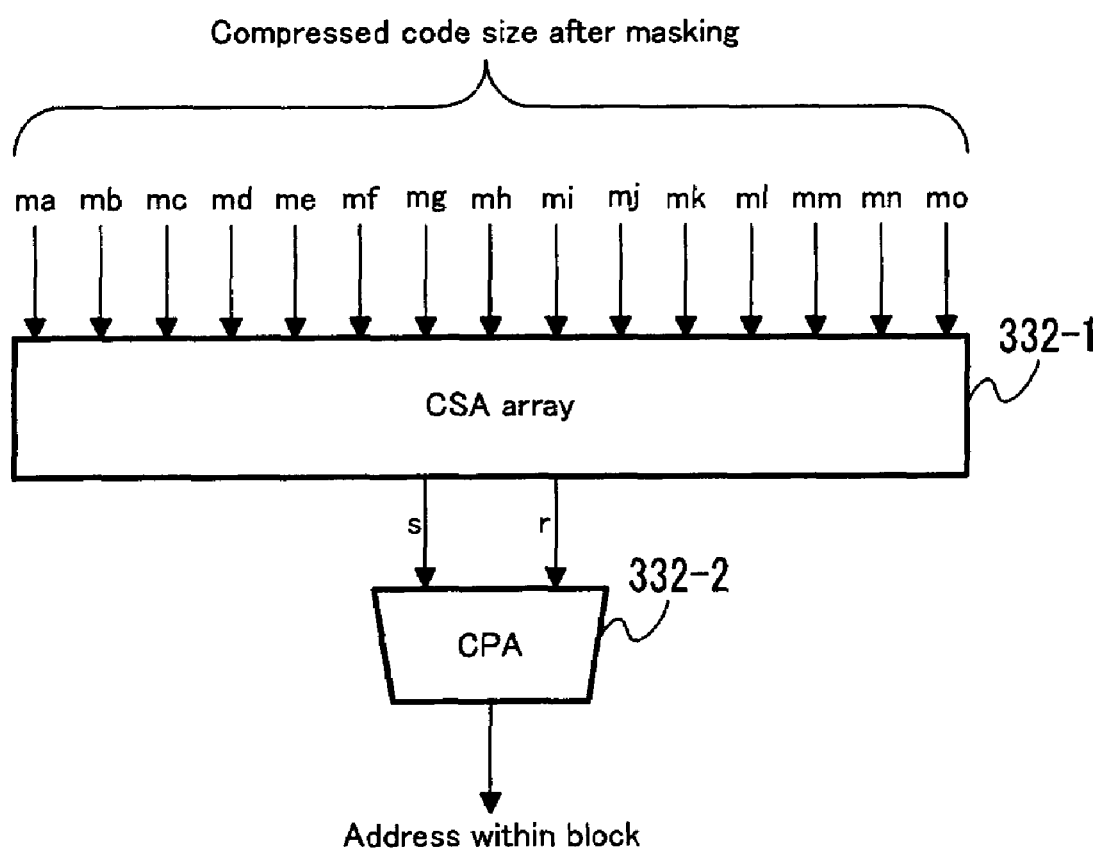
FIG. 14 is a diagram showing an example of circuit 332, which adds the compressed code sizes after masking and calculates the address within the block of the compressed code in the circuit for calculating the number of bits from the head of a block to a targeted compressed code in the first embodiment.

FIG. 14 is a diagram showing an example of the circuit 332. The compressed code sizes ma to mo after masking are added by a carry save addition array (CSA array) 332-1 and the carry save type outputs s and r are added by carry propagate adder (CPA) 332-2 to output the address within the block (in units of 2 bits).

Figure 15:
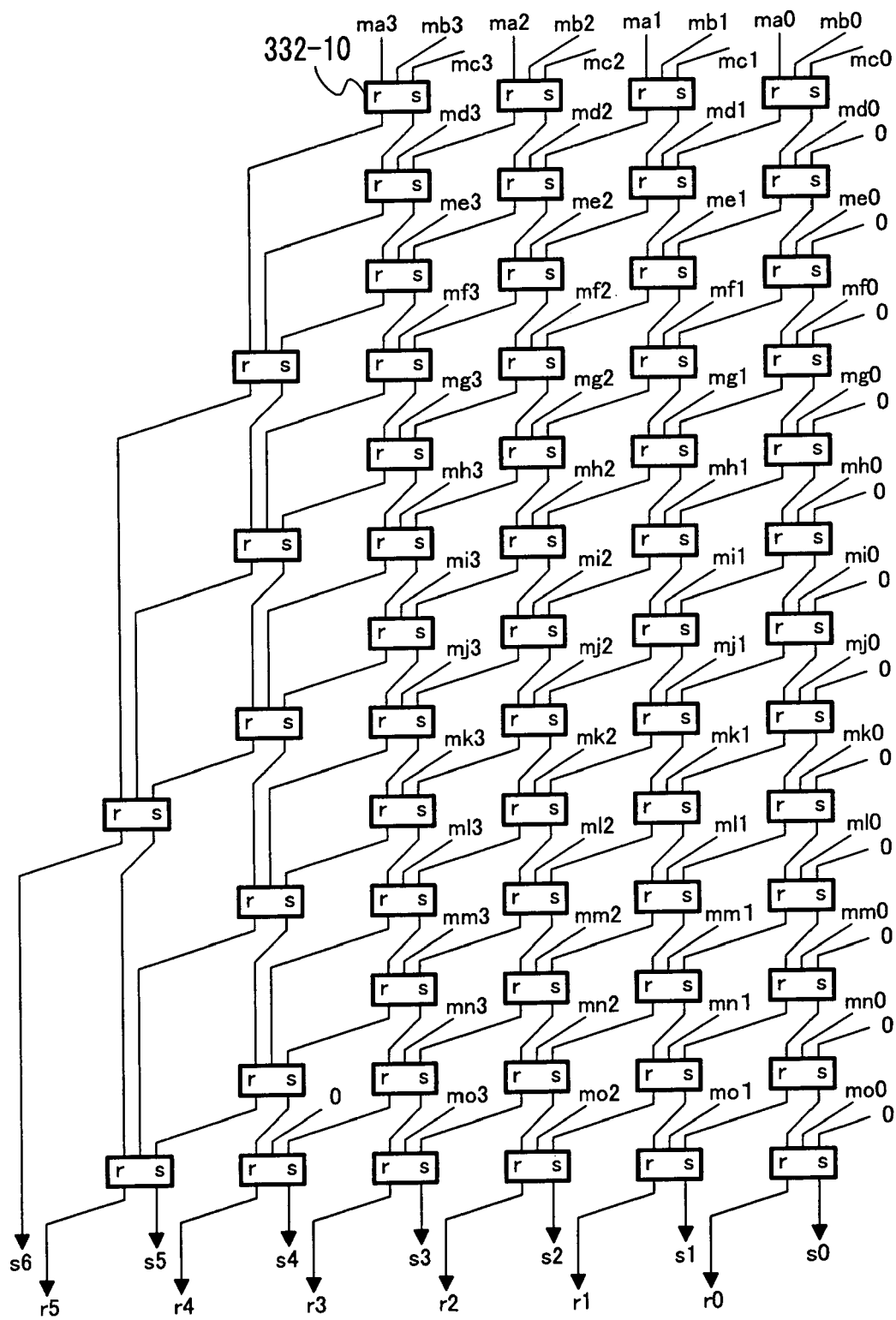
FIG. 15 is a diagram showing an example of carry save addition array 332-1, which is a component of circuit 332 in the first embodiment.

FIG. 15 is a diagram showing an example of the arrangement of CSA array 332-1. Circuit 332-10 is a 3-input, 2-output carry save adder, and the operation thereof is illustrated in FIG. 16. Each of i0, i1, and i2 is a 1-bit input, r is a carry output, and s is a sum output. In FIG. 15, a compressed code size after masking is expressed in 4 bits for a single code (for example, a) and is expressed in the form of ma3, ma2, ma1, and ma0. The arrangement is such that from the upper stage to lower stage of the figure, a compressed code size after masking for one code is input at each stage and the output is input into the next stage. In the figure, an input of 0 into the carry save adder 332-10 indicates a data of 0. The output of CSA array 332-1 is made up of 7 bits of sum s6 to s0 and 6 bits of carry r5 to r0. By addition of data obtained by shifting s6 to s0 and r5 to r0 by 1 bit in the upper direction at CPA 332-2 of FIG. 14, the address within the block is calculated.

The principle, by which the compressed code decompression circuit 3 specifies and decompresses the compressed code corresponding to the code address output by CPU 1 in the above-described arrangement, shall now be described.

The compressed code decompression circuit 3 determines the address of the address conversion information by performing the process illustrated in FIG. 5 on the code address output from CPU 1, and by referring to the determined address of memory 2, acquires the head address of the block that contains the targeted compressed code.

Then by determining the address of the compressed code type information by the process illustrated in FIG. 8 and referring this address of the memory 2, the compressed code type information of the block that contains the targeted compressed code is acquired.

Since the address within the block of the targeted compressed code is determined from the acquired compressed code type information by the circuit illustrated in FIG. 11, the address of the targeted compressed code can be determined by adding the acquired head address of the block. Also, the type of compression format (code length) of the targeted compressed code can be made known from the compressed code type information, and the targeted compressed code can thus be acquired from the memory 2.

If due to the type of compression format, decompression is not necessary, the acquired code is output as it is to CPU 1. On the other hand, if decompression is necessary, the dictionary address is determined by the process illustrated in FIG. 10 and by referring that address of the memory 2, the code requested by CPU 1 can be acquired. This code is then output to CPU 1.

Thus with the present invention, by direct designation of the address of the targeted code and decompression of just this compressed code, a high compression ratio and high-speed decompression, which are favorable for a micro controller or other embedded system, are realized.

Figure 17A:
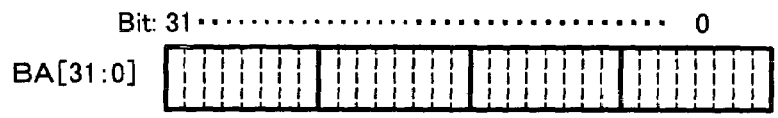
FIG. 17A, FIG. 17B and FIG. 17C show diagrams for explaining a method of calculating the compressed code address in the first embodiment.
Figure 17B:
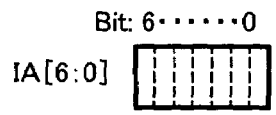
Figure 17C:
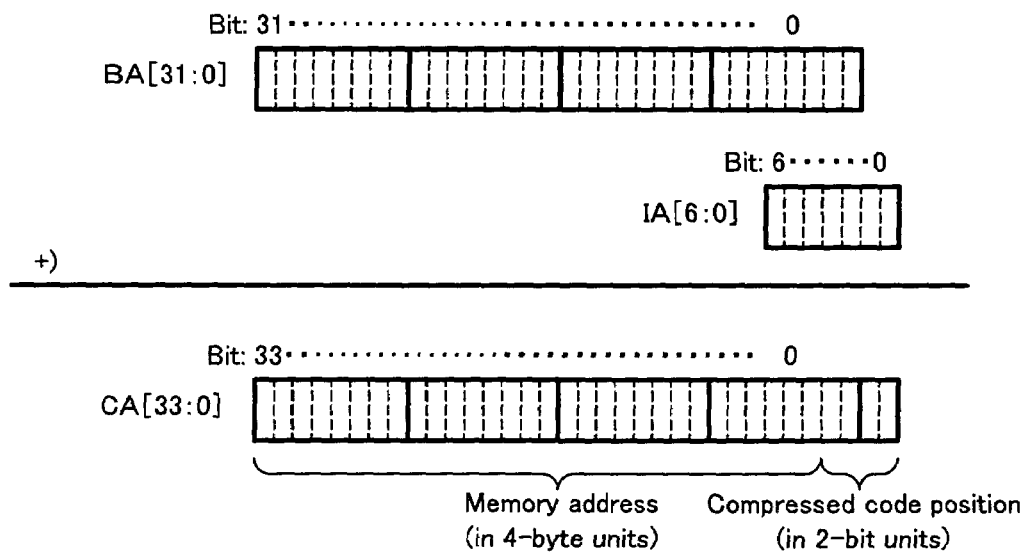

Next the process, by which the compressed code decompression circuit 3 reads a compressed code set, containing a targeted code, from the memory 2, shall be described in terms of actual implementation. Here, the compressed code set is a data unit (for example, 4 bytes of data) that is read from the memory 2. FIGS. 17A, 17B and 17C show diagrams for explaining a method of calculating the compressed code address. FIG. 17A shows the address conversion information of a code to be read by CPU 1, that is, the head address BA [31:0] (unit:bytes) of the block that contains the targeted compressed code. FIG. 17B shows the address IA [6:0] (unit: 2 bits) within the block of the targeted compressed code. FIG. 17C illustrates a method of calculating the address CA [33:0] (unit: 2 bits) of the targeted compressed code. As shown in the figure, IA is shifted by 2 bits in the lower direction and then added to BA. As a result, the upper 30 bits of CA [33:4] express the memory address of the 4-byte data that contains the targeted compressed code and the lower 4 bits of CA [3:0] express the position of the targeted compressed code in the 4-byte data read from the memory.

Figure 18:
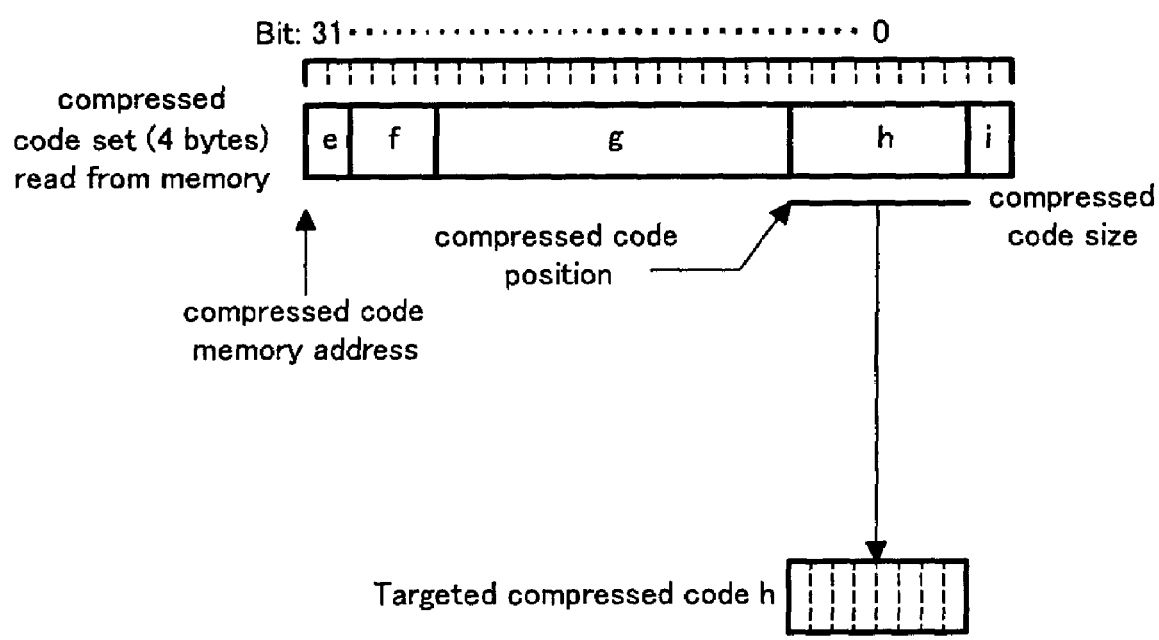
FIG. 18 is a diagram illustrating a method of extraction of the targeted compressed code from the compressed codes read from the memory in the first embodiment.

FIG. 18 is a diagram for explaining the process by which the compressed code decompression circuit 3 extracts the targeted compressed code from the compressed code set read from the memory 2. By taking out data of the size of the compressed code from the compressed code set read from the address (unit: 4 bytes) indicated by CA [33:4] of FIG. 17 and starting at the bit position (unit: 2 bits) indicated by CA [3:0], the targeted compressed code h can be obtained.

Here, a case may occur where only a part of the targeted compressed code is contained in the compressed code set read from the memory 2. For example in FIG. 18, compressed code i is the top 2 bits of a code and is not a complete code. This can be detected by using the size information of compressed code i. In this case, the targeted compressed code can be obtained by reading the compressed code set of 4 bytes in the next address of the memory 2.

An efficient method of the memory access required for decompression of a compressed code shall now be described.

Figure 19:
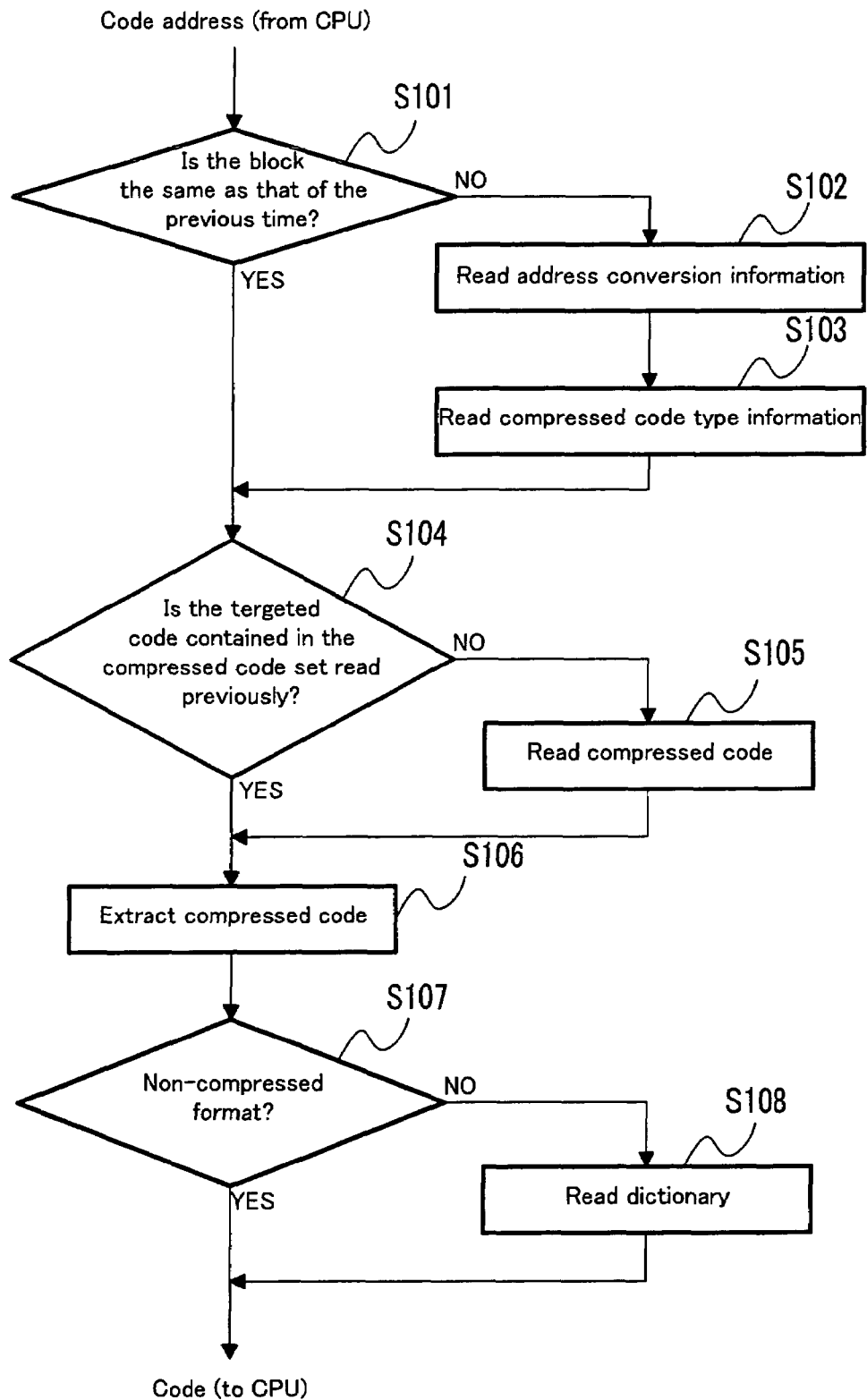
FIG. 19 is a diagram illustrating the flow of decompression of a compressed code in the first embodiment.

FIG. 19 is a flowchart for explaining the flow of the process of decompressing a compressed code. Here, the compressed code decompression circuit 3 is equipped with registers that respectively store the address conversion information, the compressed code type information, the compressed code address, and the compressed code set that have been read just immediately before.

First, the compressed code decompression circuit 3 checks from the code address output by CPU1 is whether the block is the same as that of the previous time (S101). If the block is the same, since the address conversion information and the compressed code type information have already been read from the memory 2, the next step is entered. If the block is different, the address conversion information and the compressed code type information are read from the memory 2 (S101, S103).

Next, whether or not the targeted compressed code is completely contained in the previously read compressed code set is checked (S104). If the targeted compressed code is completely contained, the next step is entered and if not, the next compressed code set is read from memory 2 (S105). If the targeted compressed code is not completely contained in the 4-byte compressed code set that is read at this point, the compressed code set of the next address is also read.

Next, the targeted compressed code is extracted from the compressed code set that has been read from the memory 2 (S106).

Whether or not the compressed code is of the non-compressed format is then checked (S107). If the code is of the non-compressed format, the code is output as it is to CPU 1. If the code is of a compressed format, the dictionary address is computed, a dictionary is read from the memory 2, and upon decompression to the original code (S108), the code is output to CPU 1.

A second embodiment of this invention shall now be described.

Figure 20:
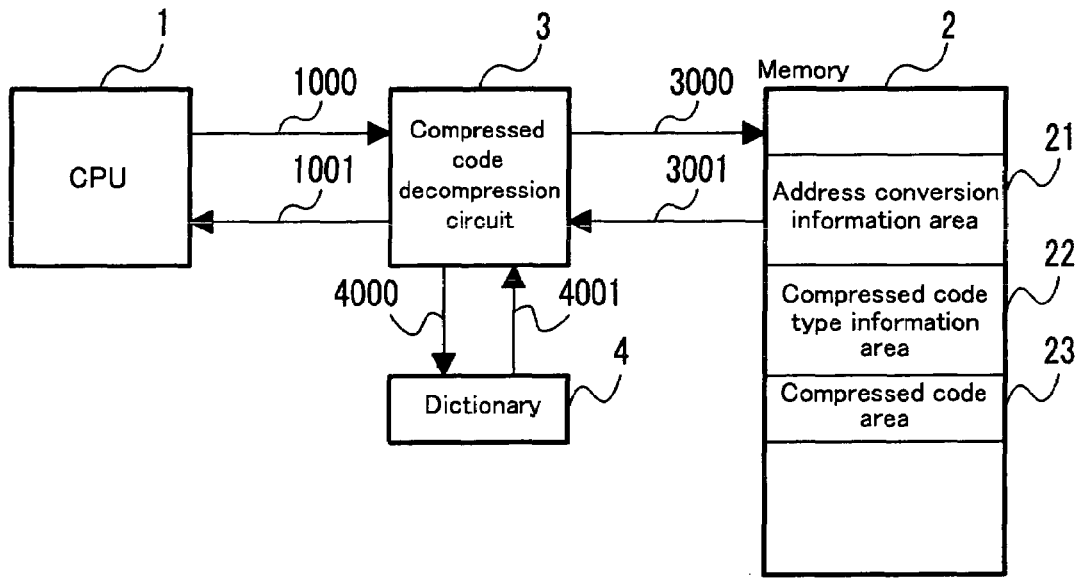
FIG. 20 is a block diagram for explaining the principal parts of the arrangement of a second embodiment of a micro controller to which this invention is applied.

FIG. 20 is a block diagram for explaining an arrangement wherein the dictionaries, which where stored in the memory 2 in the first embodiment, are stored in a dedicated storage device 4 and the compressed code decompression circuit 3 uses an address bus 4000 and data bus 4001 dedicated to the storage device 4 to access the dictionaries. For example, in a case where the memory 2 is a low-speed, high-capacity memory and a few cycles of the clock by which CPU 1 operates are required for accessing memory 2, by using a low-capacity, high-speed storage device 4 for the dictionaries, the time required for decompression of compressed codes can be shortened. In a case of an instruction fetch, instructions of continuous addresses will be fetched as long as there are no branches or interrupts. Since with the address conversion information 21, the compressed code type information 22, and the compressed code 23, information corresponding to a plurality of codes are contained in the data read from the memory, reading is not performed necessarily each time for the fetching of a single instruction. However, with a dictionary, a large amount of reading will be necessary for decompression of a compressed code of a format besides the type 3 format. The storing of dictionaries that can be made low in volume in a low-capacity but high-speed storage device 4 is effective in terms of performance, and even if there is some increase of hardware, this may be considered adequately practical in view of the effect of reducing a memory of far greater capacity.

Figure 21:
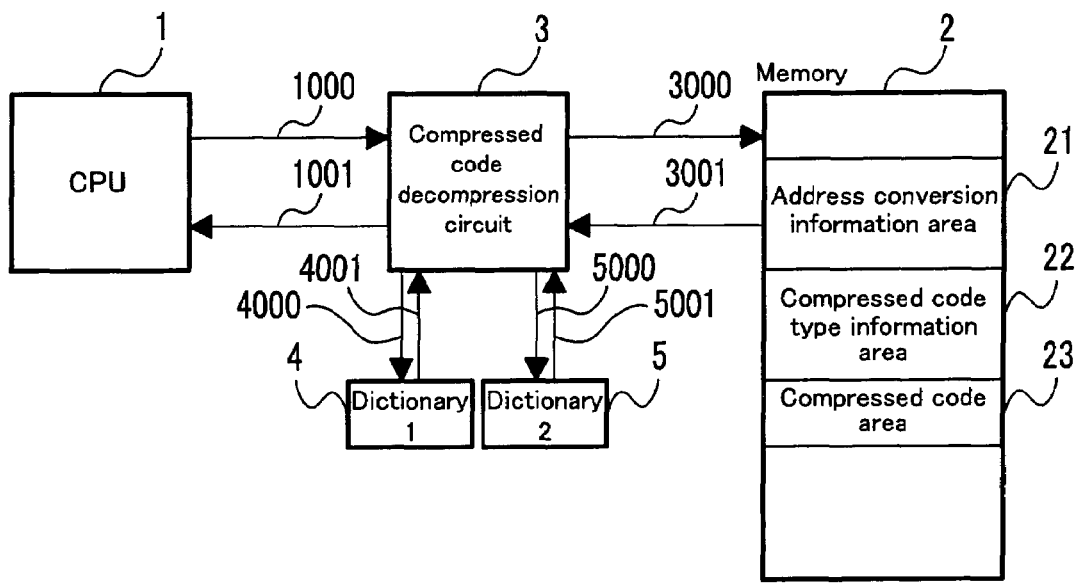
FIG. 21 is a block diagram for explaining the principal parts of the arrangement of a third embodiment of a micro controller to which this invention is applied.

FIG. 21 is a block diagram, showing a third embodiment of this invention. In comparison to the second embodiment, the storage device dedicated to dictionaries is arranged in the two parts of a storage device 4 for dictionary 1 and a storage device 5 for dictionary 2, and each storage device is connected by an independent bus to the compressed code decompression circuit 3. This arrangement is effective in a case where the width of CPU data bus 1001 is large in comparison with the unit of compression. For example, consider a case where the CPU data bus 1001 has a width of 32 bits and the unit of compression is 16 bits. In a case where the compressed code decompression circuit 3 holds only a single dictionary, only a single compressed code of a compression format type 0, 1, or 2 can be decompressed in a single cycle. Since the type 3 format does not require the referencing of a dictionary, a code of this format can be output along with another code to CPU data bus 1001. If two dictionaries can be used, since two codes of different formats can be decompressed in a single cycle, the compression performance can be improved.

Figure 22:
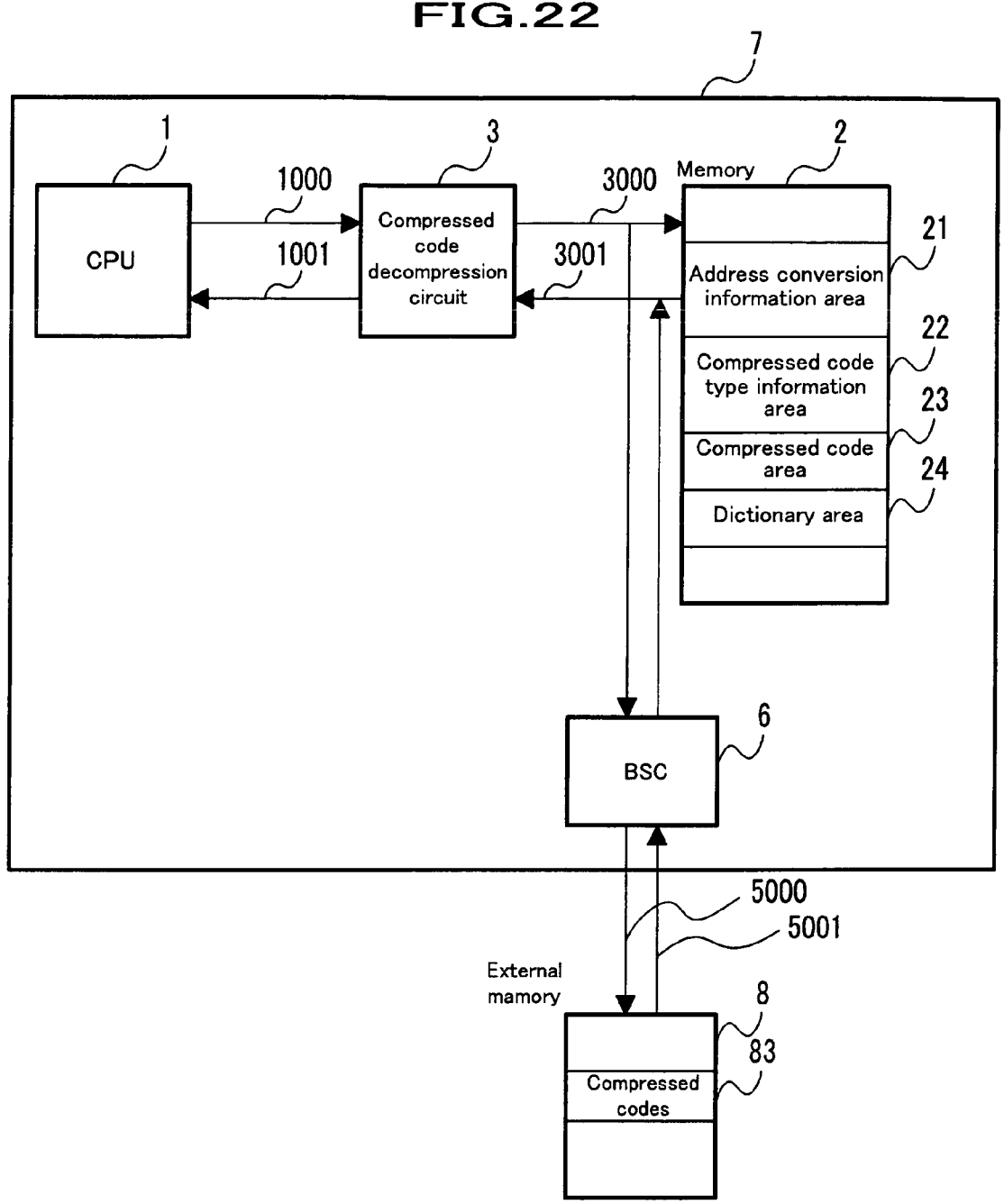
FIG. 22 is a block diagram for explaining the principal parts of the arrangement of a fourth embodiment of a micro controller to which this invention is applied.

FIG. 22 is a block diagram, showing a fourth embodiment of this invention. Here, BSC 6 is a bus state controller and is a circuit that controls the accessing of the exterior by CPU 1. Reference numeral 7 expresses a micro controller hierarchy and only the principal parts relevant to the present invention are indicated in the interior thereof. An external memory 8 is a memory that is connected to the micro controller 7 at the exterior. With this arrangement, compressed codes are also stored in the external memory 8. Though compressed codes are also stored in the memory 2, the codes can be stored in both internal memory 2 and external memory 8 or just in the external memory 8. Connection and use of the external memory 8 can be considered for a cases where the capacity of the internal memory 2 of the micro controller is insufficient, and also by storing compressed codes 83 in an external memory, it may be possible to make improvements in terms of performance and consumption power in comparison with a case where non-compressed codes are stored. This is because the amount of code read by the micro controller 7 will be less in the case of a compressed format. The effect is especially large in a case where the speed of the external bus is slow in comparison with the interior of the micro controller.

Figure 23:
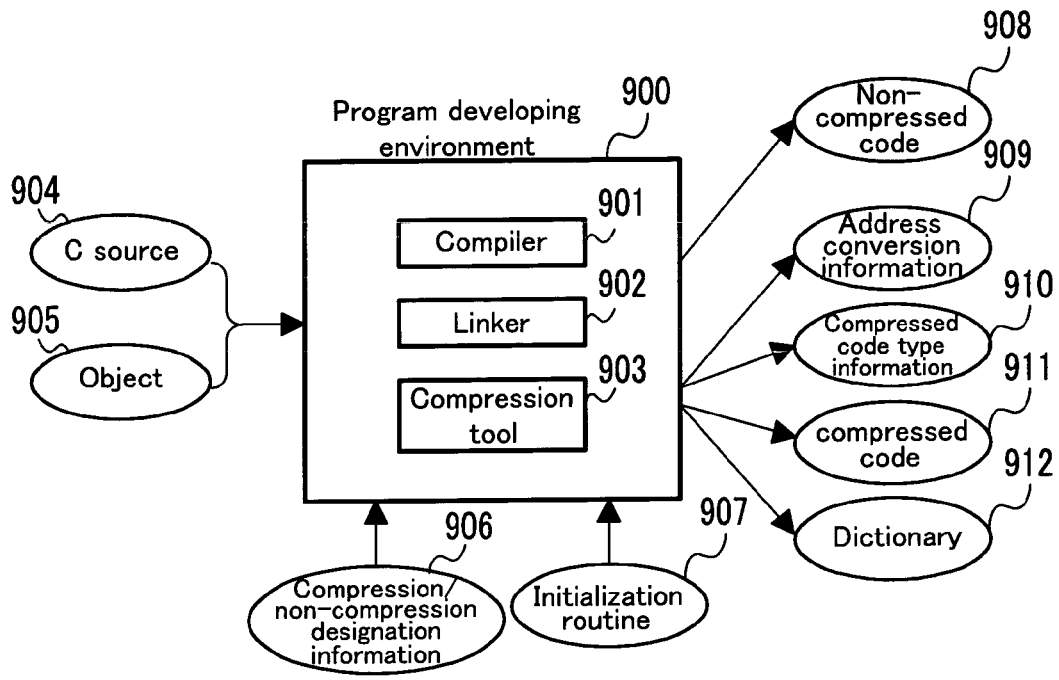
FIG. 23 is a diagram illustrating the flow of compression of a micro controller program in the present invention.

A compression method shall now be described. FIG. 23 is a diagram, showing the flow of compression of a micro controller program. Compression may be performed on both a source code 904 and an object code 905. A program developing environment 900 includes a compiler 901, a linker 902, and a compression tool 903. Compression/non-compression designation information 906 relates to which parts of the source code 904 and the object code 905 are to be compressed and which parts are not to be compressed. Initialization routine 907 is a program that performs register setting of information necessary for decompression of compressed codes, such as the address conversion information base address, compressed code size information base address, etc., after the turning on of the power or resetting of the micro controller. By the processes of the compiler 901, the linker 902, and the compression tool 903, five types of data are output. A part that was designated as being a non-compressed by compression/non-compression designation information 906 is output as a non-compressed code 908. A part that was designated to be compressed generates an address conversion information 909, a compressed code type information 910, a compressed code 911, and a dictionary 912. By writing these output data in the memory of the micro controller, execution of a program containing non-compressed codes and compressed codes is enabled.

Figure 24:
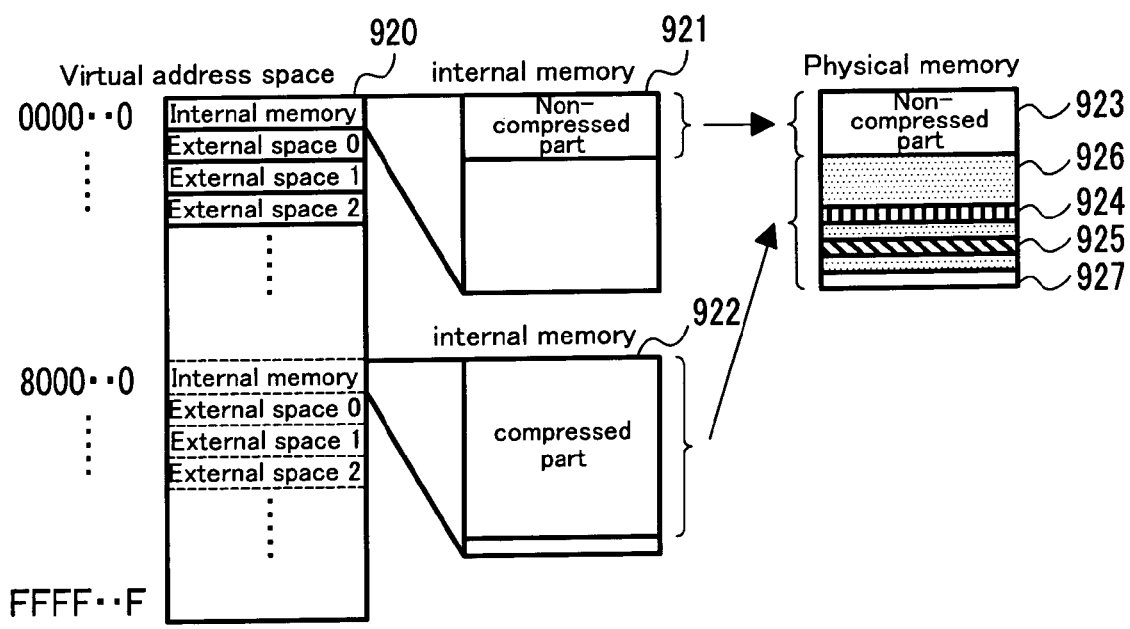
FIG. 24 is a method for explaining a method of mixing non-compressed codes and compressed codes in the present invention.

FIG. 24 is a diagram for explaining a method of mixing non-compressed codes with compressed codes. A virtual address space 920 is a memory map of the CPU, and starting, for example from address No. 0, several spaces, such as an internal memory, an external space 0, an external space 1, etc., are allocated. These spaces are used as non-compressed areas. By the compiling and linking processes, codes that are not to be compressed are mapped onto a part of the internal memory space 921 of the virtual address space. From the address at exactly half of virtual address memory space 920, several spaces, such as an internal memory, an external space 0, an external space 1, etc., are allocated again, and these are used as compressed areas. By the compiling and linking processes, codes that are to be compressed are mapped onto a part of the internal memory space 922 of the virtual address space. The non-compressed part 921 of the virtual address space is mapped as it is onto the physical memory. With compressed part 922, codes are generated on the real memory as an address conversion information 924, a compressed code type information 925, compressed code 926, and a dictionary 927 by the compression tool. When the program is executed, the CPU accesses the virtual address space, and the compressed code decompression circuit sees the uppermost bit of the CPU address and if this is 0, uses the CPU address as it is to access a non-compressed code, and if the uppermost bit is 1, performs address conversion, reads the address conversion information, compressed code type information, compressed code, and dictionary as necessary and performs decompression of the compressed code.

What is claimed is:

1. A micro controller, comprising a CPU, performing processing in accordance with a program,
   said micro controller further comprising:
   a memory, storing: grouped compressed codes, resulting from the conversion of original codes into variable length codes in a plurality of compressed code format types, and each type has a fixed length,
   wherein the plurality of compressed code format types include a first type of a first compressed code length, and a second type of a second compressed code length,
   an address conversion information, specifying the head address of each group of grouped compressed codes of variable lengths; and
   a compressed code type information in blocks corresponding to the groups of the compressed codes, including compressed code format type data corresponding to the compressed codes, and indicating the compress code format types of the corresponding compressed codes contained in each group; and
   a compressed code processing part, specifying, from a code address output by the CPU, an address conversion information and compressed code type information to be referred, and using the specified address conversion information and the compressed code type information to determine the corresponding compressed code address, and reading the corresponding compressed code.

2. The micro controller as set forth in claim 1, wherein
   the memory furthermore stores dictionary information for decompressing compressed codes into the original codes and
   the compressed code processing part refers the dictionary information to decompress the compressed code, which has been read, into the original code.

3. The micro controller as set forth in claim 1, wherein
said compressed code processing part stores information for identifying the area in said memory in which compressed codes are stored, the area in said memory in which the address conversion information are stored, and the area in which the compressed code type information are stored.

4. The micro controller as set forth in claim 3, wherein
said memory stores said address conversion information in the order of blocks of original codes, and
to store said compressed code type information in the order of the original codes.

5. The micro controller as set forth in claim 2, wherein
said dictionary information are stored in areas that are divided according to the code lengths of the corresponding compressed codes, and in each area, said dictionary information are stored in the order of the codes of said corresponding compressed codes.

6. The micro controller as set forth in claim 5, wherein
said compressed code processing part specifies, from the compressed code type information, the area in which the dictionary information to be referred is stored, and, based on the compressed code, specifies the dictionary information to be referred that is contained in the specified area.

7. The micro controller as set forth in claim 1, wherein
said compressed code processing part reads, from said memory and prior to reading a compressed code, a compressed code set, having a predetermined size and containing the compressed code to be read,
said micro controller is equipped with areas, respectively storing temporarily the address conversion information, the compressed code type information, and the compressed code set that were used just immediately before,
to use the address conversion information and the compressed code type information that are stored temporarily in said areas in a case where the code address output by the CPU is contained in the same block as the compressed code that was read just immediately before, and
to read the compressed code from the compressed code set that is stored temporarily in said area in a case where the compressed code corresponding to the code address output by the CPU is contained in the compressed code set that was read just immediately before.

8. The micro controller as set forth in claim 1, wherein
said compressed code contains the same program as the original code.

9. The micro controller as claimed in claim 1, wherein the code address includes a group number identifying the head address of the group and an order number identifying the compressed code format type datum in the block corresponding to the group identified by the group number, and the processing part determines a base address of the block of the compressed code type information in accordance with the group number and a distance from the base address to the compressed code format type datum identified by the order number using a sum of the fixed code lengths of the compressed code format types represented by the compress code format type data between the base address and the compressed code format type identified by the order number.

10. A micro controller, comprising a CPU, performing processing in accordance with a program,
said micro controller further comprising:
a memory, storing: grouped compressed codes, resulting from the conversion of original codes into variable length codes in a plurality of compressed code format types, and each type has a fixed length,
wherein the plurality of compressed code format types include a first type of a first compressed code length, and a second type of a second compressed code length,
an address conversion information, specifying the head address of each group of grouped compressed codes of variable lengths; and
compressed code type information in blocks corresponding to the groups of compressed codes, including compressed code format type data indicating the compressed code format types of the compressed codes; and
a compressed code processing part, determining, from a code address output by the CPU and via which the code address the CPU specifies one of the original codes and using the address conversion information and the compressed code type information, a compressed code address of a compress code corresponding to the specified original code, and reading the corresponding compressed code.

* * * * *

UNITED STATES PATENT AND TRADEMARK OFFICE
CERTIFICATE OF CORRECTION

| | |
|---|---|
| PATENT NO. | : 7,676,651 B2 |
| APPLICATION NO. | : 10/611315 |
| DATED | : March 9, 2010 |
| INVENTOR(S) | : Yamada et al. |

Page 1 of 1

It is certified that error appears in the above-identified patent and that said Letters Patent is hereby corrected as shown below:

Title page, item (73), change "Hitachi, Ltd., Tokyo (JP)" to --Renesas Technology Corporation., Tokyo (JP)--.

Signed and Sealed this

Second Day of November, 2010

David J. Kappos
*Director of the United States Patent and Trademark Office*